(12) United States Patent
Gradwohl

(10) Patent No.: US 10,518,892 B2
(45) Date of Patent: Dec. 31, 2019

(54) MOTOR MOUNTING FOR AN UNMANNED AERIAL SYSTEM

(71) Applicant: Wing Aviation LLC, Mountain View, CA (US)

(72) Inventor: Raymond Gradwohl, Saratoga, CA (US)

(73) Assignee: Wing Aviation LLC, Mountain View, CA (US)

( * ) Notice: Subject to any disclaimer, the term of this patent is extended or adjusted under 35 U.S.C. 154(b) by 295 days.

(21) Appl. No.: 15/695,156

(22) Filed: Sep. 5, 2017

(65) Prior Publication Data

US 2019/0071186 A1 Mar. 7, 2019

(51) Int. Cl.
| | |
|---|---|
| *B64D 27/26* | (2006.01) |
| *H02K 5/04* | (2006.01) |
| *F16M 11/04* | (2006.01) |
| *B64C 39/02* | (2006.01) |
| *B64F 5/40* | (2017.01) |
| *B64C 29/02* | (2006.01) |

(Continued)

(52) U.S. Cl.
CPC ............ *B64D 27/26* (2013.01); *B64C 39/024* (2013.01); *B64F 5/40* (2017.01); *H02K 5/04* (2013.01); *B64C 29/02* (2013.01); *B64C 2201/021* (2013.01); *B64C 2201/024* (2013.01); *B64C 2201/042* (2013.01); *B64C 2201/108* (2013.01); *B64C 2201/127* (2013.01); *B64C 2201/128* (2013.01); *B64C 2201/141* (2013.01); *B64C 2201/146* (2013.01); *B64C 2201/162* (2013.01); *B64C 2201/165* (2013.01); *B64D 2027/262* (2013.01); *F16B 2/245* (2013.01); *F16M 11/041* (2013.01); *G01C 21/00* (2013.01)

(58) Field of Classification Search
CPC .. B64C 2201/042; B64D 27/24; B64D 27/26; F16B 2/06; F16B 2/245; F16M 11/041; H02K 5/04; H02K 5/22
See application file for complete search history.

(56) References Cited

U.S. PATENT DOCUMENTS

| | | | | |
|---|---|---|---|---|
| 3,346,126 | A | * 10/1967 | Bloom | ................. A47B 57/487 211/192 |
| 4,373,696 | A | 2/1983 | Dochterman | |

(Continued)

*Primary Examiner* — Joseph W Sanderson
(74) *Attorney, Agent, or Firm* — McDonnell Boehnen Hulbert & Berghoff LLP

(57) ABSTRACT

Systems and methods for mounting a motor to a receiving device of a UAS are disclosed herein. The motor may include a number of protruding elements, each protruding element including a shank segment having a first diameter and a head segment having a second diameter that is larger than the first diameter. The receiving device may include a base configured to couple the receiving device to the UAS, a first sidewall extending upwardly from a first side of the base, and a second sidewall extending upwardly from a second side of the base. Both the first and second sidewalls may include at least one receptacle. The head segment of each protruding element may be configured to interlock with one or more of the receptacles of the first sidewall or the second sidewall when the protruding elements are inserted between the first sidewall and the second sidewall of the receiving device.

20 Claims, 12 Drawing Sheets

(51) Int. Cl.
*G01C 21/00* (2006.01)
*F16B 2/24* (2006.01)

(56) References Cited

U.S. PATENT DOCUMENTS

| | | | | |
|---|---|---|---|---|
| 4,527,760 A * | 7/1985 | Salacuse | ............... | A47K 1/09 24/DIG. 53 |
| 4,697,777 A * | 10/1987 | Yang | ............... | F16M 11/10 248/343 |
| 4,731,030 A * | 3/1988 | Johnston | ............... | F16M 11/041 439/10 |
| 5,148,582 A * | 9/1992 | Dennis, Jr. | ............... | A44B 11/006 24/573.11 |
| 5,688,030 A * | 11/1997 | McAnally | ............... | G06F 1/181 312/223.2 |
| 6,065,733 A | 5/2000 | Correa et al. | | |
| 6,783,298 B2 * | 8/2004 | Root | ............... | F16B 21/09 248/222.41 |
| 6,974,291 B2 * | 12/2005 | Li | ............... | F16B 37/0864 411/267 |
| 8,491,168 B2 * | 7/2013 | Cooper | ............... | F16B 2/245 24/457 |
| 9,359,070 B2 * | 6/2016 | Caubel | ............... | B64C 27/08 |
| 9,623,969 B2 | 4/2017 | Nelson | | |
| 9,707,901 B2 * | 7/2017 | Lee | ............... | B60R 11/02 |
| 9,914,538 B2 * | 3/2018 | Yu | ............... | B64C 39/024 |
| 10,093,418 B2 * | 10/2018 | Lim | ............... | B64C 27/08 |
| 2003/0068196 A1 * | 4/2003 | Root | ............... | F16B 21/09 403/331 |
| 2003/0140503 A1 * | 7/2003 | Jerez | ............... | A01B 1/065 30/276 |
| 2005/0238460 A1 * | 10/2005 | Li | ............... | F16B 37/0864 411/432 |
| 2008/0104805 A1 * | 5/2008 | Cameron | ............... | B60P 7/0823 24/346 |
| 2014/0061402 A1 * | 3/2014 | Bernstein | ............... | A47F 5/04 248/125.3 |
| 2015/0129711 A1 * | 5/2015 | Caubel | ............... | B64C 27/08 244/17.23 |
| 2016/0144954 A1 * | 5/2016 | Daigle | ............... | B64C 39/024 244/17.23 |
| 2016/0226335 A1 | 8/2016 | Nicoloff | | |
| 2016/0268750 A1 * | 9/2016 | Evans | ............... | H01R 35/00 |
| 2016/0362066 A1 * | 12/2016 | Lee | ............... | B60R 11/02 |
| 2017/0088280 A1 | 3/2017 | Beckman et al. | | |
| 2017/0113800 A1 | 4/2017 | Freeman | | |
| 2017/0144753 A1 * | 5/2017 | Yu | ............... | B64C 39/024 |
| 2017/0327220 A1 * | 11/2017 | Hu | ............... | B64C 39/024 |
| 2018/0022451 A1 * | 1/2018 | Lim | ............... | B64C 27/08 244/17.23 |
| 2019/0055027 A1 * | 2/2019 | Martin | ............... | B64D 27/26 |

* cited by examiner

MOTOR MOUNTING FOR AN UNMANNED AERIAL SYSTEM

BACKGROUND

An unmanned system, which may also be referred to as an autonomous vehicle, is a vehicle capable of travel without a physically-present human operator. An unmanned system may operate in a remote-control mode, in an autonomous mode, or in a partially autonomous mode.

When an unmanned system operates in a remote-control mode, a pilot or driver that is at a remote location can control the unmanned vehicle via commands that are sent to the unmanned vehicle via a wireless link. When the unmanned system operates in autonomous mode, the unmanned system typically moves based on pre-programmed navigation waypoints, dynamic automation systems, or a combination of these. Further, some unmanned systems can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned systems exist for various different environments. For instance, unmanned systems exist for operation in the air, on the ground, underwater, and in space. Examples include quad-copters and tail-sitter UASs, among others. Unmanned systems also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Example systems and methods may relate to mounting a motor to an unmanned aerial system (UAS). A UAS may include a number of motors for facilitating flight of the UAS. For instance the UAS could include multiple motors for powering lift rotors configured to provide vertical propulsion or propellers configured to provide horizontal propulsion. Traditionally, such motors may include a number of mounting holes for bolting or screwing the motors to the UAS. For instance, each motor could be coupled to the UAS by four or more bolts. As a result, removing or installing multiple motors, or even a single motor, can be tedious and time-consuming. The present disclosure provides example systems and methods to help address these or other issues.

In one example, a system is provided that includes a receiving device comprising a base configured to couple the receiving device to a UAS, a first sidewall extending upwardly from a first side of the base, wherein the first sidewall includes at least one receptacle, and a second sidewall extending upwardly from a second side of the base, wherein the second sidewall includes at least one receptacle. The system further includes a motor coupling comprising one or more protruding elements, wherein each protruding element comprises a shank segment having a first diameter and a head segment having a second diameter that is larger than the first diameter, wherein each head segment is configured to interlock with one or more of the receptacles of the first sidewall or the second sidewall when the motor coupling is inserted between the first sidewall and the second sidewall of the receiving device.

In another example, a UAS is provided that includes a motor and one or more protruding elements coupled to the motor, wherein each protruding element comprises a shank segment having a first diameter and a head segment having a second diameter that is larger than the first diameter. The UAS further includes a receiving device configured to receive the one or more protruding elements, the receiving device comprising a base configured to couple the receiving device to the UAS, a first sidewall extending upwardly from a first side of the base, wherein the first sidewall includes at least one receptacle, and a second sidewall extending upwardly from a second side of the base, wherein the second sidewall includes at least one receptacle. In practice, the head segment of each protruding element is configured to interlock with one or more of the receptacles of the first sidewall or the second sidewall when the one or more protruding elements are inserted between the first sidewall and the second sidewall of the receiving device.

In yet another example, a method is provided for mounting a motor to a receiving device coupled to a UAS, wherein the motor comprises a plurality of protruding elements, each protruding element comprising a shank segment having a first diameter and a head segment having a second diameter that is larger than the first diameter, wherein the receiving device comprises a first sidewall having a first groove and at least one receptacle adjacent to the first groove, wherein the receiving device further comprises a second sidewall having a second groove and at least one receptacle adjacent to the second groove, and wherein the second sidewall is positioned opposite to the first sidewall. The method includes positioning the motor such that the head segments of one or more protruding elements of the plurality of protruding elements aligns with the first and second grooves of the receiving device, moving the motor along a first axis toward the receiving device such that the head segments of the one or more protruding elements are inserted between the first and second sidewalls of the receiving device along the first and second grooves, and moving the motor along a second axis such that the head segments of the one or more protruding elements are moved out of the first and second grooves to interlock with the receptacles of the first and second sidewalls of the receiving device.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1A:
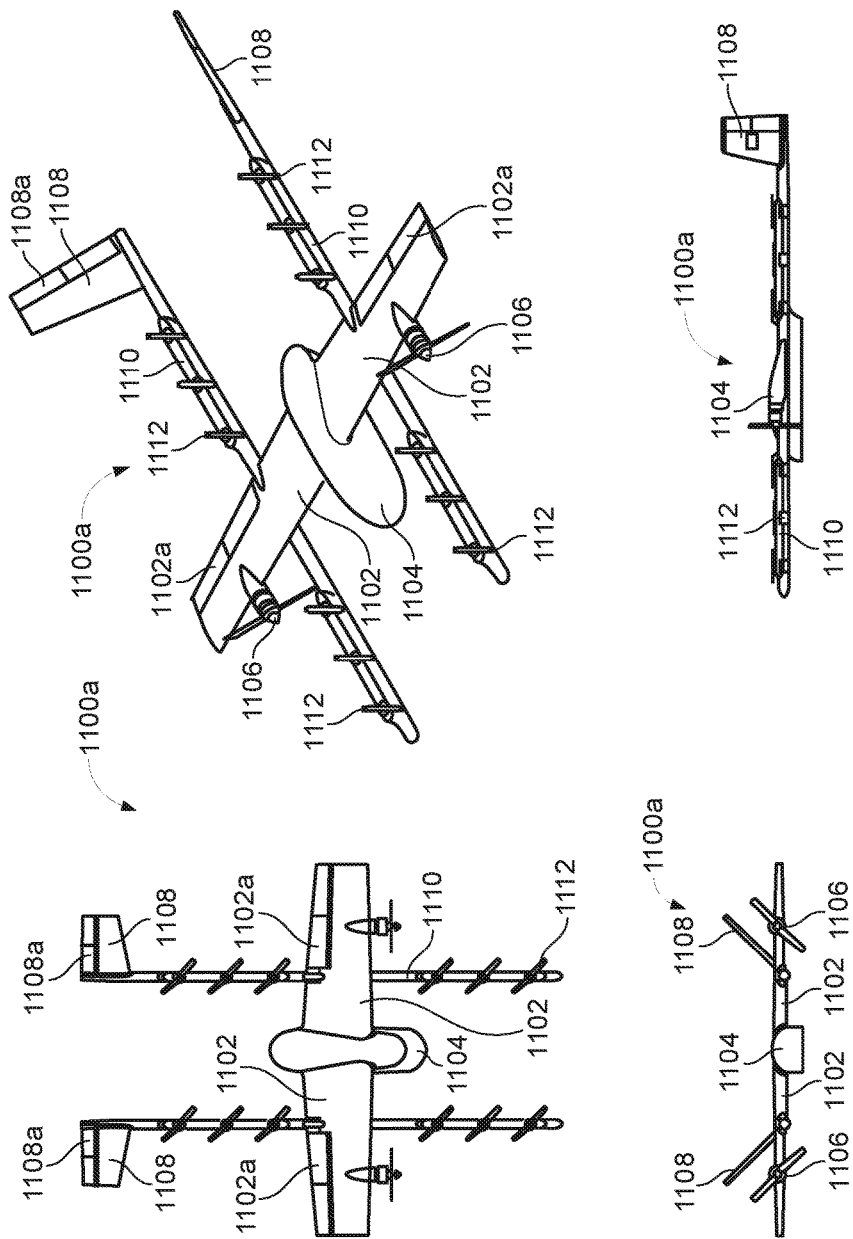
FIG. 1A is a simplified illustration of an unmanned aerial system, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

A UAS may include various types of rotors or propellers for generating lift or thrust and thereby facilitating flight of the UAS. Such rotors or propellers may be powered by individual motors. In various circumstances, such as during repair or maintenance of the UAS, the motors may be removed from and reinstalled on the UAS. Traditionally, such a process may involve unscrewing multiple bolts that secure the motor to the UAS in order to remove the motor, and then screwing the bolts back into the UAS in order to reinstall the motor. This process may consume an excessive amount of time, which could be problematic in situations where time is of the essence, such as when the UAS needs to deliver a perishable good. Accordingly, the example embodiments disclosed herein may include or otherwise relate to systems and methods for more quickly mounting and unmounting a motor to and from a UAS.

In particular, a motor may include a number of protruding elements configured to snap into and out of a flexible receiving device. The receiving device may include a number of receptacles for interlocking with the protruding elements, and the receiving device may also include one or more grooves for guiding the protruding elements toward alignment with the receptacles. Further, because the motor may vibrate during operation, the receiving device may include vibration dampening material for isolating the motor from the UAS and reducing the extent of vibrations transferred from the motor to the UAS.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, and components, and circuits have not been described in detail so as not to unnecessarily obscure aspects of the embodiments.

II. ILLUSTRATIVE UNMANNED SYSTEMS

Herein, the terms "unmanned aerial system" and "UAS" refer to any autonomous or semi-autonomous vehicle that is capable of performing some functions without a physically present human pilot.

A UAS can take various forms. For example, a UAS may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" (UAV) may also be used to refer to a UAS.

FIG. 1A is a simplified illustration providing various views of a UAS, according to an example embodiment. In particular, FIG. 1A shows an example of a fixed-wing UAS 1100a, which may also be referred to as an airplane, an aeroplane, a biplane, a glider, or a plane, among other possibilities. The fixed-wing UAS 1100a, as the name implies, has stationary wings 1102 that generate lift based on the wing shape and the vehicle's forward airspeed. For instance, the two wings 1102 may have an airfoil-shaped cross section to produce an aerodynamic force on the UAS 1100a.

As depicted, the fixed-wing UAS 1100a may include a wing body or fuselage 1104. The wing body 1104 may contain, for example, control electronics such as an inertial measurement unit (IMU) and/or an electronic speed controller, batteries, other sensors, and/or a payload, among other possibilities. The illustrative UAS 1100a may also include landing gear (not shown) to assist with controlled take-offs and landings. In other embodiments, other types of UASs without landing gear are also possible.

The UAS 1100a further includes propulsion units 1106 positioned on the wings 1102 (or fuselage), which can each include a motor, shaft, and propeller, for propelling the UAS 1100a. Stabilizers 1108 (or fins) may also be attached to the UAS 1100a to stabilize the UAS's yaw (turn left or right) during flight. In some embodiments, the UAS 1100a may be also be configured to function as a glider. To do so, UAS 1100a may power off its motor, propulsion units, etc., and glide for a period of time. In the UAS 1100a, a pair of rotor supports 1110 extend beneath the wings 1102, and a plurality of rotors 1112 are attached rotor supports 1110. Rotors 1112 may be used during a hover mode wherein the UAS 1100a is descending to a delivery location, or ascending following a delivery. In the example UAS 1100*a*, stabilizers 1108 are shown attached to the rotor supports 1110.

During flight, the UAS 1100*a* may control the direction and/or speed of its movement by controlling its pitch, roll, yaw, and/or altitude. For example, the stabilizers 1108 may include one or more rudders 1108*a* for controlling the UAS's yaw, and the wings 1102 may include one or more elevators for controlling the UAS's pitch and/or one or more ailerons 1102*a* for controlling the UAS's roll. As another example, increasing or decreasing the speed of all the propellers simultaneously can result in the UAS 1100*a* increasing or decreasing its altitude, respectively.

Figure 1B:
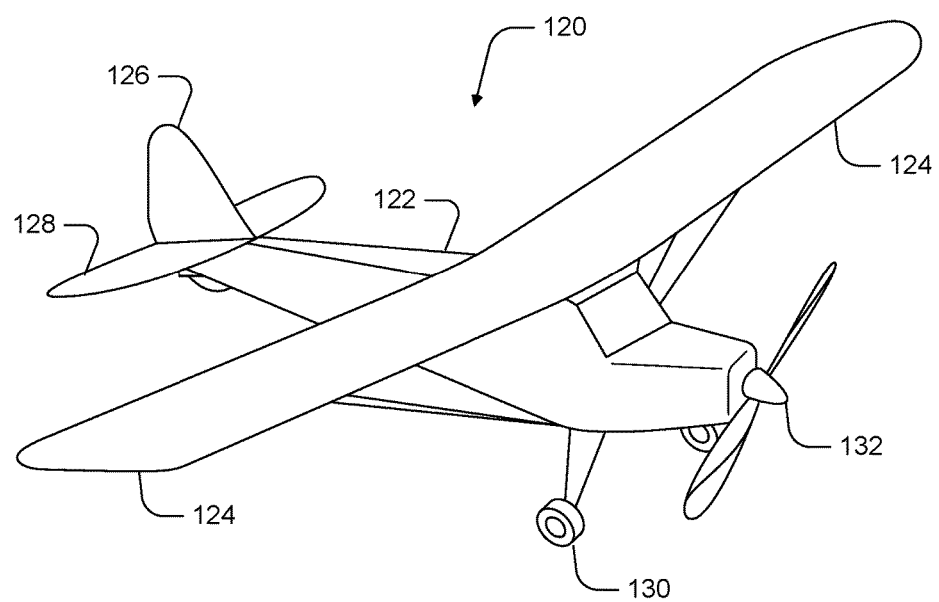
FIG. 1B is a simplified illustration of an unmanned aerial system, according to an example embodiment.

Similarly, FIG. 1B shows another example of a fixed-wing UAS 120. The fixed-wing UAS 120 includes a fuselage 122, two wings 124 with an airfoil-shaped cross section to provide lift for the UAS 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
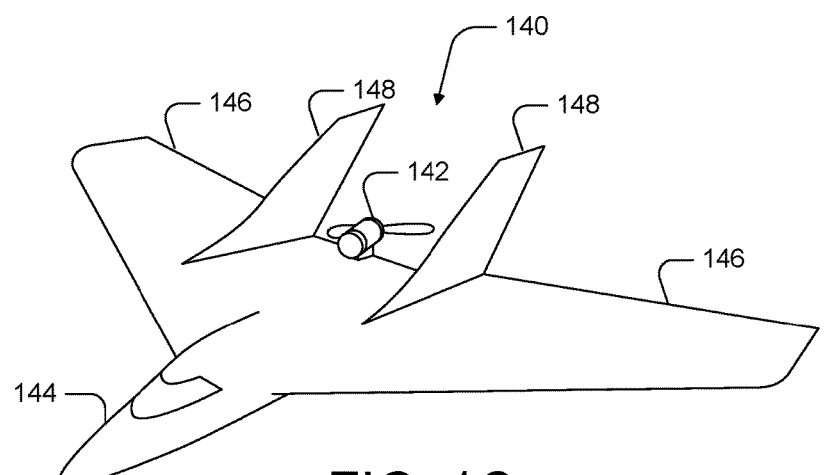
FIG. 1C is a simplified illustration of an unmanned aerial system, according to an example embodiment.

FIG. 1C shows an example of a UAS 140 with a propeller in a pusher configuration. The term "pusher" refers to the fact that a propulsion unit 142 is mounted at the back of the UAS and "pushes" the vehicle forward, in contrast to the propulsion unit being mounted at the front of the UAS. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
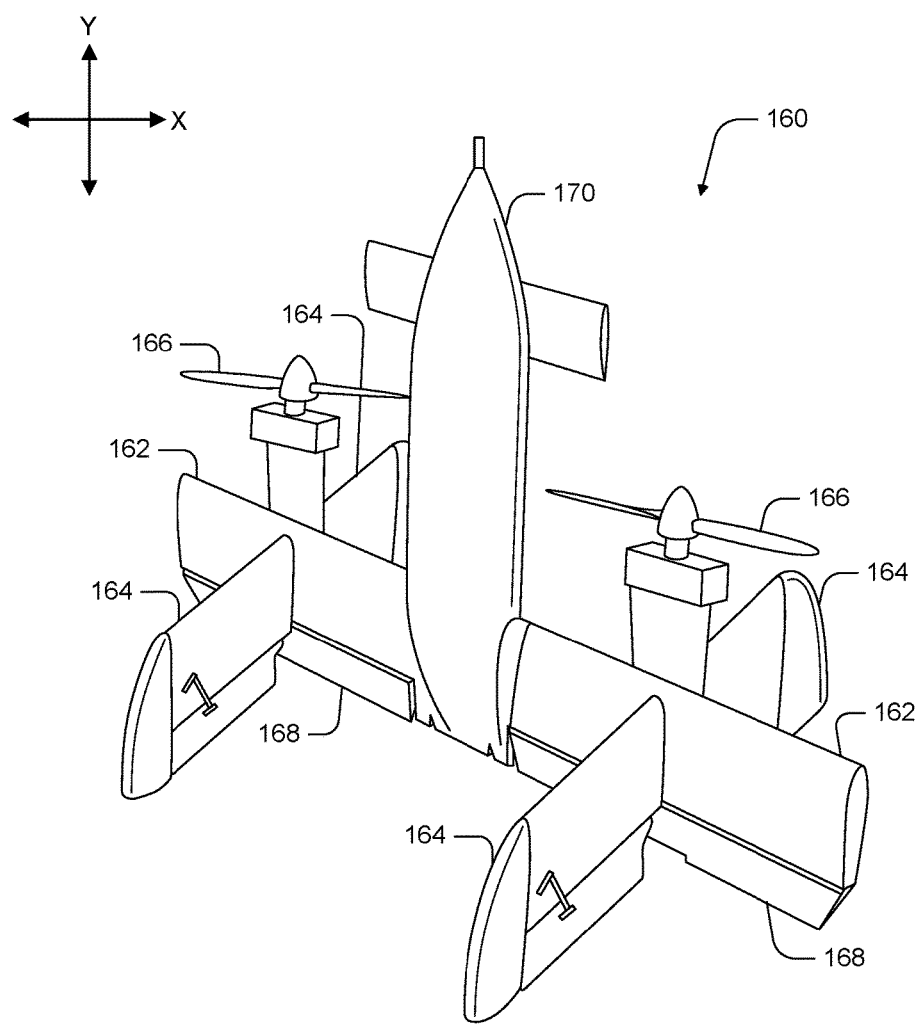
FIG. 1D is a simplified illustration of an unmanned aerial system, according to an example embodiment.

FIG. 1D shows an example of a tail-sitter UAS 160. In the illustrated example, the tail-sitter UAS 160 has fixed wings 162 to provide lift and allow the UAS 160 to glide horizontally (e.g., along the x-axis, in a position that is approximately perpendicular to the position shown in FIG. 1D). However, the fixed wings 162 also allow the tail-sitter UAS 160 to take off and land vertically on its own.

For example, at a launch site, the tail-sitter UAS 160 may be positioned vertically (as shown) with its fins 164 and/or wings 162 resting on the ground and stabilizing the UAS 160 in the vertical position. The tail-sitter UAS 160 may then take off by operating its propellers 166 to generate an upward thrust (e.g., a thrust that is generally along the y-axis). Once at a suitable altitude, the tail-sitter UAS 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAS 160 can fly in a similar manner as a typical airplane.

Many variations on the illustrated fixed-wing UASs are possible. For instance, fixed-wing UASs may include more or fewer propellers, and/or may utilize a ducted fan or multiple ducted fans for propulsion. Further, UASs with more wings (e.g., an "x-wing" configuration with four wings), with fewer wings, or even with no wings, are also possible.

Figure 1E:
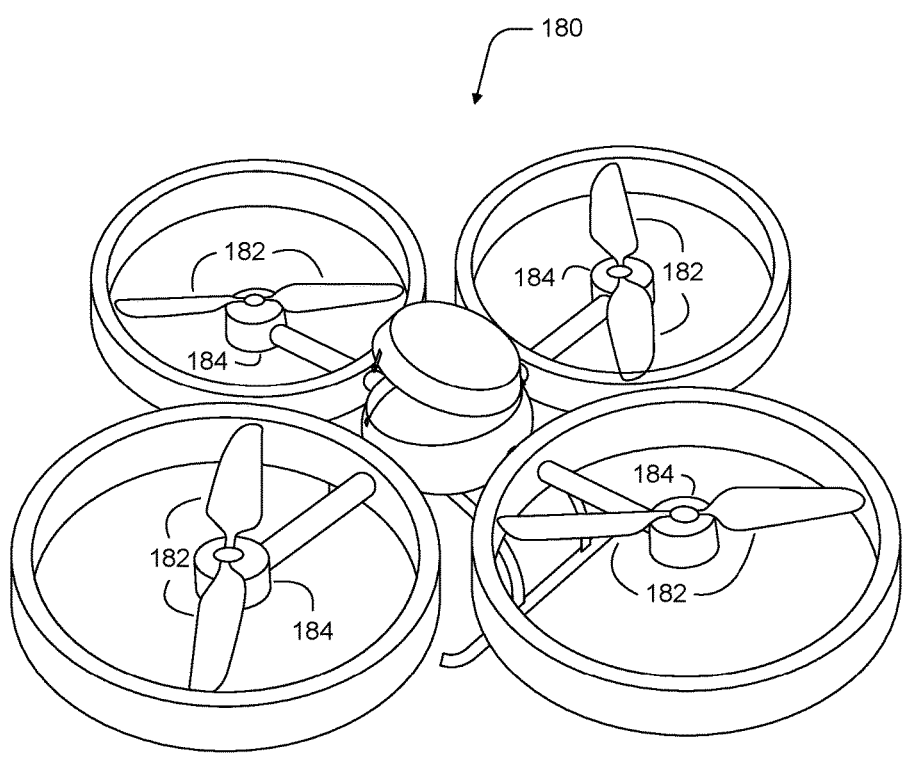
FIG. 1E is a simplified illustration of an unmanned aerial system, according to an example embodiment.

As noted above, some embodiments may involve other types of UASs, in addition to or in the alternative to fixed-wing UASs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAS can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAS may be configured to allow a remote operator to take over functions that can otherwise be controlled autonomously by the UAS. Yet further, a given type of function may be controlled remotely at one level of abstraction and performed autonomously at another level of abstraction. For example, a remote operator could control high level navigation decisions for a UAS, such as by specifying that the UAS should travel from one location to another (e.g., from a warehouse in a suburban area to a delivery address in a nearby city), while the UAS's navigation system autonomously controls more fine-grained navigation decisions, such as the specific route to take between the two locations, specific flight controls to achieve the route and avoid obstacles while navigating the route, and so on.

More generally, it should be understood that the example UASs described herein are not intended to be limiting. Example embodiments may relate to, be implemented within, or take the form of any type of unmanned aerial vehicle.

III. ILLUSTRATIVE UAS COMPONENTS

Figure 2:
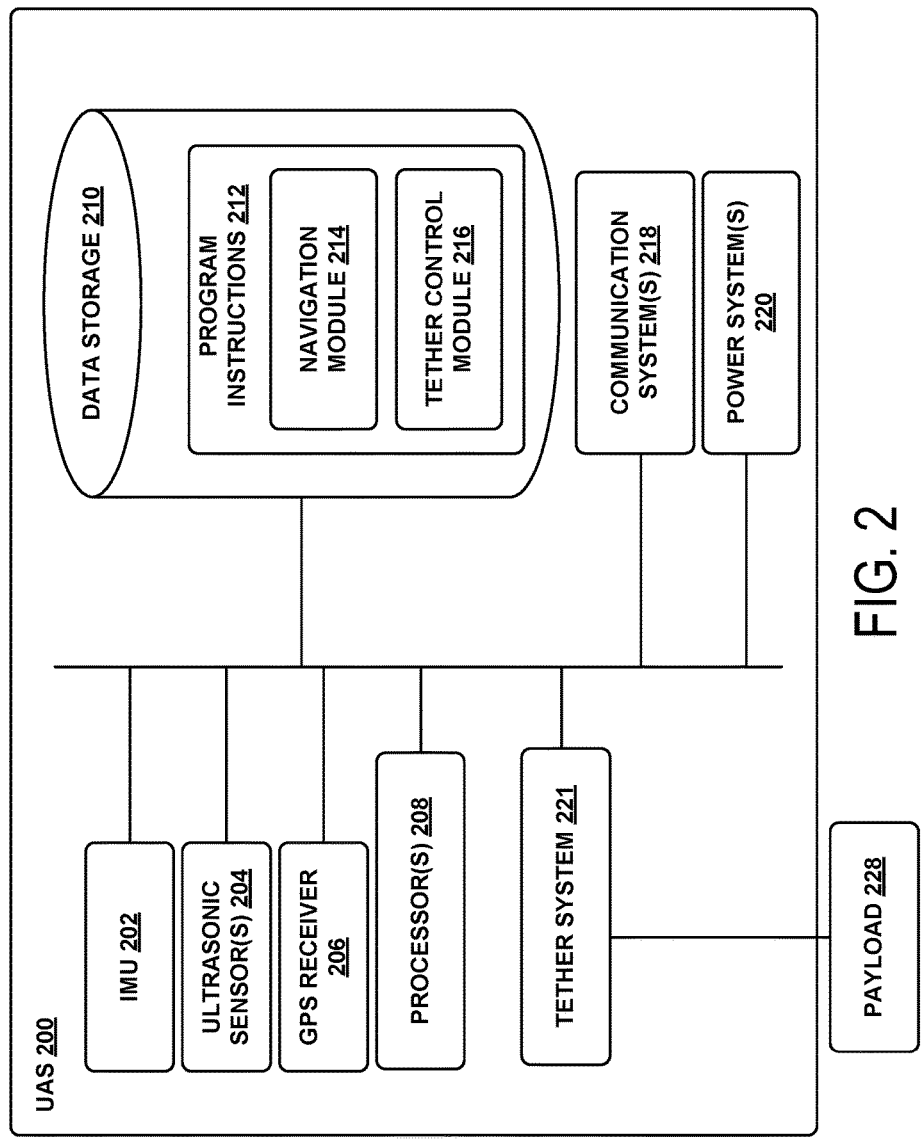
FIG. 2 is a simplified block diagram illustrating components of an unmanned aerial system, according to an example embodiment.

FIG. 2 is a simplified block diagram illustrating components of a UAS 200, according to an example embodiment. UAS 200 may take the form of, or be similar in form to, one of the UASs 100, 120, 140, 160, and 180 described in reference to FIGS. 1A-1E. However, UAS 200 may also take other forms.

UAS 200 may include various types of sensors, and may include a computing system configured to provide the functionality described herein. In the illustrated embodiment, the sensors of UAS 200 include an inertial measurement unit (IMU) 202, ultrasonic sensor(s) 204, and a GPS 206, among other possible sensors and sensing systems.

In the illustrated embodiment, UAS 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAS described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAS 200. As such, the data storage 210 may include program instructions 212 to perform or facilitate some or all of the UAS functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAS 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAS 200. Two examples of such sensors are magnetometers and pressure sensors. In some embodiments, a UAS may include a low-power, digital 3-axis magnetometer, which can be used to realize an orientation independent electronic compass for accurate heading information. However, other types of magnetometers may be utilized as well. Other examples are also possible. Further, note that a UAS could include some or all of the above-described inertia sensors as separate components from an IMU.

UAS 200 may also include a pressure sensor or barometer, which can be used to determine the altitude of the UAS 200. Alternatively, other sensors, such as sonic altimeters or radar altimeters, can be used to provide an indication of altitude, which may help to improve the accuracy of and/or prevent drift of an IMU.

In a further aspect, UAS 200 may include one or more sensors that allow the UAS to sense objects in the environment. For instance, in the illustrated embodiment, UAS 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAS 200 may also include one or more imaging system(s). For example, one or more still and/or video cameras may be utilized by UAS 200 to capture image data from the UAS's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAS 200 may also include a GPS receiver 206. The GPS receiver 206 may be configured to provide data that is typical of well-known GPS systems, such as the GPS coordinates of the UAS 200. Such GPS data may be utilized by the UAS 200 for various functions. As such, the UAS may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAS 200 to, e.g., move about its environment and reach a desired location. To do so, the navigation module 214 may control the altitude and/or direction of flight by controlling the mechanical features of the UAS that affect flight (e.g., its rudder(s), elevator(s), aileron(s), and/or the speed of its propeller(s)).

In order to navigate the UAS 200 to a target location, the navigation module 214 may implement various navigation techniques, such as map-based navigation and localization-based navigation, for instance. With map-based navigation, the UAS 200 may be provided with a map of its environment, which may then be used to navigate to a particular location on the map. With localization-based navigation, the UAS 200 may be capable of navigating in an unknown environment using localization. Localization-based navigation may involve the UAS 200 building its own map of its environment and calculating its position within the map and/or the position of objects in the environment. For example, as a UAS 200 moves throughout its environment, the UAS 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAS 200 to move from waypoint to waypoint, in order to ultimately travel to a final destination (e.g., a final waypoint in a sequence of waypoints).

In a further aspect, the navigation module 214 and/or other components and systems of the UAS 200 may be configured for "localization" to more precisely navigate to the scene of a target location. More specifically, it may be desirable in certain situations for a UAS to be within a threshold distance of the target location where a payload 228 is being delivered by a UAS (e.g., within a few feet of the target destination). To this end, a UAS may use a two-tiered approach in which it uses a more-general location-determination technique to navigate to a general area that is associated with the target location, and then use a more-refined location-determination technique to identify and/or navigate to the target location within the general area.

For example, the UAS 200 may navigate to the general area of a target destination where a payload 228 is being delivered using waypoints and/or map-based navigation. The UAS may then switch to a mode in which it utilizes a localization process to locate and travel to a more specific location. For instance, if the UAS 200 is to deliver a payload to a user's home, the UAS 200 may need to be substantially close to the target location in order to avoid delivery of the payload to undesired areas (e.g., onto a roof, into a pool, onto a neighbor's property, etc.). However, a GPS signal may only get the UAS 200 so far (e.g., within a block of the user's home). A more precise location-determination technique may then be used to find the specific target location.

Various types of location-determination techniques may be used to accomplish localization of the target delivery location once the UAS 200 has navigated to the general area of the target delivery location. For instance, the UAS 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAS 200 reaches the general area of the target delivery location (or of a moving subject such as a person or their mobile device), the UAS 200 may switch to a "fly-by-wire" mode where it is controlled, at least in part, by a remote operator, who can navigate the UAS 200 to the specific target location. To this end, sensory data from the UAS 200 may be sent to the remote operator to assist them in navigating the UAS 200 to the specific location.

As yet another example, the UAS 200 may include a module that is able to signal to a passer-by for assistance in either reaching the specific target delivery location; for example, the UAS 200 may display a visual message requesting such assistance in a graphic display, play an audio message or tone through speakers to indicate the need for such assistance, among other possibilities. Such a visual or audio message might indicate that assistance is needed in delivering the UAS 200 to a particular person or a particular location, and might provide information to assist the passer-by in delivering the UAS 200 to the person or location (e.g., a description or picture of the person or location, and/or the person or location's name), among other possibilities. Such a feature can be useful in a scenario in which the UAS is unable to use sensory functions or another location-determination technique to reach the specific target location. However, this feature is not limited to such scenarios.

In some embodiments, once the UAS 200 arrives at the general area of a target delivery location, the UAS 200 may utilize a beacon from a user's remote device (e.g., the user's mobile phone) to locate the person. Such a beacon may take various forms. As an example, consider the scenario where a remote device, such as the mobile phone of a person who requested a UAS delivery, is able to send out directional signals (e.g., via an RF signal, a light signal and/or an audio signal). In this scenario, the UAS 200 may be configured to navigate by "sourcing" such directional signals—in other words, by determining where the signal is strongest and navigating accordingly. As another example, a mobile device can emit a frequency, either in the human range or outside the human range, and the UAS 200 can listen for that frequency and navigate accordingly. As a related example, if the UAS 200 is listening for spoken commands, then the UAS 200 could utilize spoken statements, such as "I'm over here!" to source the specific location of the person requesting delivery of a payload.

In an alternative arrangement, a navigation module may be implemented at a remote computing device, which communicates wirelessly with the UAS 200. The remote computing device may receive data indicating the operational state of the UAS 200, sensor data from the UAS 200 that allows it to assess the environmental conditions being experienced by the UAS 200, and/or location information for the UAS 200. Provided with such information, the remote computing device may determine altitudinal and/or directional adjustments that should be made by the UAS 200 and/or may determine how the UAS 200 should adjust its mechanical features (e.g., its rudder(s), elevator(s), aileron(s), and/or the speed of its propeller(s)) in order to effectuate such movements. The remote computing system may then communicate such adjustments to the UAS 200 so it can move in the determined manner.

C. Communication Systems

In a further aspect, the UAS 200 includes one or more communication systems 218. The communications systems 218 may include one or more wireless interfaces and/or one or more wireline interfaces, which allow the UAS 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAS 200 may include communication systems 218 that allow for both short-range communication and long-range communication. For example, the UAS 200 may be configured for short-range communications using Bluetooth and for long-range communications under a CDMA protocol. In such an embodiment, the UAS 200 may be configured to function as a "hot spot;" or in other words, as a gateway or proxy between a remote support device and one or more data networks, such as a cellular network and/or the Internet. Configured as such, the UAS 200 may facilitate data communications that the remote support device would otherwise be unable to perform by itself.

For example, the UAS 200 may provide a WiFi connection to a remote device, and serve as a proxy or gateway to a cellular service provider's data network, which the UAS might connect to under an LTE or a 3G protocol, for instance. The UAS 200 could also serve as a proxy or gateway to a high-altitude balloon network, a satellite network, or a combination of these networks, among others, which a remote device might not be able to otherwise access.

D. Power Systems

In a further aspect, the UAS 200 may include power system(s) 220. The power system 220 may include one or more batteries for providing power to the UAS 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAS 200 may employ various systems and configurations in order to transport and deliver a payload 228. In some implementations, the payload 228 of a given UAS 200 may include or take the form of a "package" designed to transport various goods to a target delivery location. For example, the UAS 200 can include a compartment, in which an item or items may be transported. Such a package may include one or more food items, purchased goods, medical items, or any other object(s) having a size and weight suitable to be transported between two locations by the UAS. In other embodiments, a payload 228 may simply be the one or more items that are being delivered (e.g., without any package housing the items).

In some embodiments, the payload 228 may be attached to the UAS and located substantially outside of the UAS during some or all of a flight by the UAS. For example, the package may be tethered or otherwise releasably attached below the UAS during flight to a target location. In an embodiment where a package carries goods below the UAS, the package may include various features that protect its contents from the environment, reduce aerodynamic drag on the system, and prevent the contents of the package from shifting during UAS flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAS. This may move some of the frontal area and volume of the package away from the wing(s) of the UAS, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAS and may cause the contents of the package to shift less during flight.

In order to deliver the payload, the UAS may include a tether system 221, which may be controlled by the tether control module 216 in order to lower the payload 228 to the ground while the UAS hovers above. The tether system 221 may include a tether, which is couplable to a payload 228 (e.g., a package). The tether 224 may be wound on a spool that is coupled to a motor 222 of the UAS (although passive implementations, without a motor, are also possible). The motor may be a DC motor (e.g., a servo motor) that can be actively controlled by a speed controller, although other motor configurations are possible. In some embodiments, the tether control module 216 can control the speed controller to cause the 222 to rotate the spool, thereby unwinding or retracting the tether and lowering or raising the payload coupling apparatus. In practice, a speed controller may output a desired operating rate (e.g., a desired RPM) for the spool, which may correspond to the speed at which the tether system should lower the payload towards the ground. The motor may then rotate the spool so that it maintains the desired operating rate (or within some allowable range of operating rates).

In order to control the motor via a speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

In some embodiments, a payload coupling component (e.g., a hook or another type of coupling component) can be configured to secure the payload 228 while being lowered from the UAS by the tether. The coupling apparatus or component and can be further configured to release the payload 228 upon reaching ground level via electrical or electro-mechanical features of the coupling component. The payload coupling component can then be retracted to the UAS by reeling in the tether using the motor.

In some implementations, the payload 228 may be passively released once it is lowered to the ground. For example, a payload coupling component may provide a passive release mechanism, such as one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAS. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAS upon delivery of the payload 228.

In another implementation, a payload coupling component may include a hook feature that passively releases the payload when the payload contacts the ground. For example, the payload coupling component may take the form of or include a hook feature that is sized and shaped to interact with a corresponding attachment feature (e.g., a handle or hole) on a payload taking the form of a container or tote. The hook may be inserted into the handle or hole of the payload container, such that the weight of the payload keeps the payload container secured$_{[CM1]}$ to the hook feature during flight. However, the hook feature and payload container may be designed such that when the container contacts the ground and is supported from below, the hook feature slides out of the container's attachment feature, thereby passively releasing the payload container. Other passive release configurations are also possible.

Active payload release mechanisms are also possible. For example, sensors such as a barometric pressure based altimeter and/or accelerometers may help to detect the position of the release mechanism (and the payload) relative to the ground. Data from the sensors can be communicated back to the UAS and/or a control system over a wireless link and used to help in determining when the release mechanism has reached ground level (e.g., by detecting a measurement with the accelerometer that is characteristic of ground impact). In other examples, the UAS may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAS 200 could include an air-bag drop system or a parachute drop system. Alternatively, a UAS 200 carrying a payload could simply land on the ground at a delivery location. Other examples are also possible.

IV. ILLUSTRATIVE MOTORS AND MOTOR MOUNTS

Figure 3A:
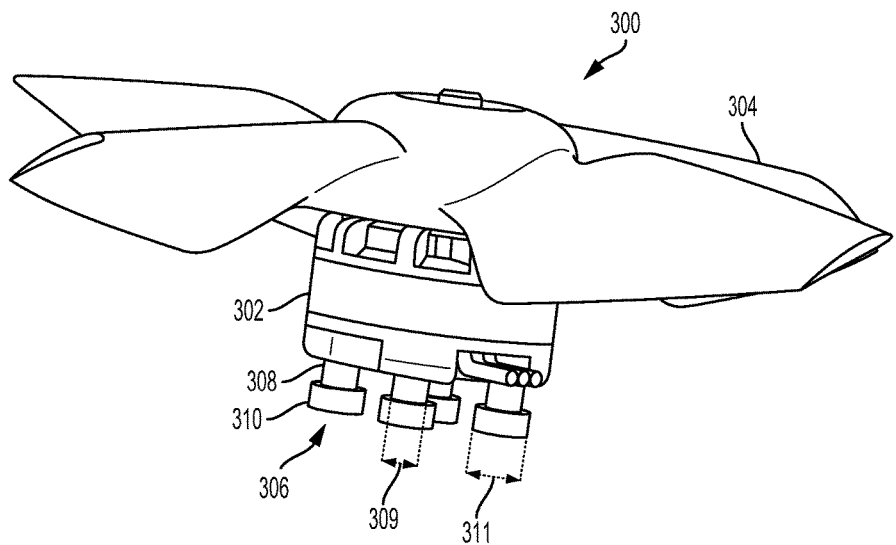
FIG. 3A is a simplified illustration of a motor unit of an unmanned aerial system, according to an example embodiment.

FIG. 3A is a simplified illustration of a motor unit 300 for use in connection with one or more of the UASs depicted in FIGS. 1A-1E, according to an example embodiment. For instance, the motor unit 300 may be used as one of the rotors 1112 or propulsion units 1106 of the UAS 1100*a* depicted in FIG. 1A, but other examples are possible as well.

As shown, the motor unit 300 may include a motor 302, rotor blades 304, and a motor coupling that includes a number of protruding elements 306. The motor 302 is coupled to the rotor blades 304 and may include various components for rotating the rotor blades 304. For instance, the motor 302 may be an AC or a DC motor having a rotatable shaft that is coupled to the rotor blades 304. Various examples of the motor 302 include the Scorpion motors provided by Scorpion Power System Ltd of Kirkland, Wash., the EMAX motors provided by YINYAN Model Tech MFT of China, and the DYS motors provided by Dong Yang Model Technology Co. of China.

The protruding elements 306 of the motor unit 300 may be coupled to the motor 302 and may function to couple the motor 302 to a UAS. The protruding elements 306 may comprise various different types of materials, including various types of metals or plastics. For instance, the protruding elements 306 may comprise aluminum or nylon due to their high specific strengths. As shown, the protruding elements 306 extend downward from a bottom of the motor 302 relative to the rotor blades 304, but other arrangements are possible as well. Each protruding element 306 includes a shank portion 308 and a head portion 310. The head portion 310 may have a diameter or width 311 that is larger than a diameter or width 309 of the shank portion 308, which may allow for mounting the motor to a receiving device of a UAS by inserting the head portion 310 into a corresponding receptacle, as described in further detail below.

As shown, the motor unit 300 includes four protruding elements 306 arranged in a square pattern, but in other examples the motor unit 300 may include a different number of protruding elements 306 arranged in a different pattern. For instance, in some examples, the motor unit 300 may include more than four protruding elements 306, and in other examples, the motor unit 300 may include fewer than four protruding elements 306, and may include only one single protruding element 306. In examples where the motor unit 300 includes more than one protruding element 306, the protruding elements 306 may be arranged in various patterns, such as a linear, triangular, rectangular, circular, rhomboidal, trapezoidal, or other polygonal pattern.

The protruding elements 306 may be coupled to the motor 302 in various ways. As noted above, traditionally a motor may be mounted to a UAS using threaded bolts or screws. To facilitate this, the motor 302 may be outfitted with a number of threaded mounting holes for receiving the bolts or screws. In such a scenario, the protruding elements 306 may thus be coupled to the motor 302 using the threaded mounting holes of the motor 302. Accordingly, the shank 308 of each protruding element 306 may have a threaded portion, such that the protruding element 306 may be coupled to the motor 302 by screwing the threaded portion of the shank 308 into the threaded mounting holes of the motor 302. For example, the protruding element 306 may take the form of a bolt or a shoulder screw. Other examples are possible as well. For instance, the protruding elements 306 may be coupled to the motor 302 using glue, epoxy, solder, welding, or the like, or the protruding elements 306 may be formed as part of the motor 302 during manufacture.

Figure 3B:
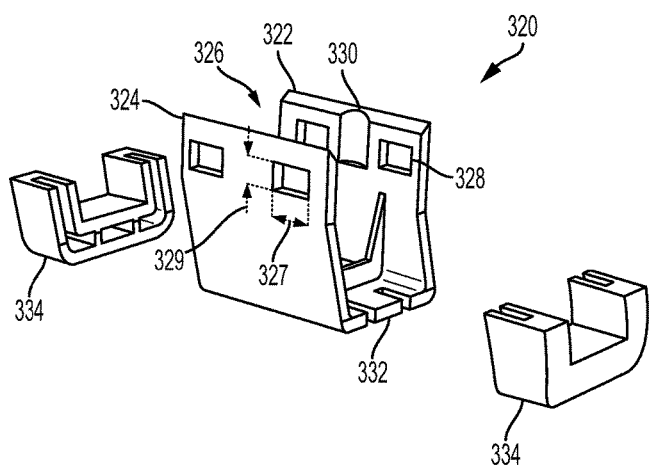
FIG. 3B is a simplified illustration of a motor receiving unit of an unmanned aerial system, according to an example embodiment.

FIG. 3B is a simplified illustration of a motor receiving unit 320 of a UAS, according to an example embodiment. The motor receiving unit 320 may be designed to mount the motor unit 300 to a UAS by receiving and engaging the protruding elements 306 of the motor unit 300, as described in further detail below.

The motor receiving unit 320 includes a first sidewall 322 and a second sidewall 324 positioned opposite to the first sidewall 322, such that a gap 326 exists between the first sidewall 322 and the second sidewall 324. The first and second sidewalls 322, 324 may include a number of receptacles 328 for receiving the head portions 310 of the protruding elements 306. In order to be capable of receiving the head portions 310 of the protruding elements 306, a width 327 of the receptacles 328 may be greater than or equal to the diameter 311 of the head portions 310, and a height 329 of the receptacles 328 may be greater than or equal to a height 313 of the head portions. As shown, the receptacles 328 may be formed as openings in the first and second sidewalls 322, 324. The openings may extend entirely through the sidewalls 322, 324, or they may extend only partially into the sidewalls 322, 324.

Further, the number and position of receptacles 328 may vary in example embodiments based on the number and position of the protruding elements 306 of the motor unit 300. By way of example, because the motor unit 300 depicted in FIG. 3A includes four protruding elements 306 arranged in a square pattern, the motor receiving unit 320 depicted in FIG. 3B also includes four receptacles 328 arranged in a corresponding square pattern. However, in examples where the protruding elements 306 are arranged in different configurations, the receptacles 328 may be arranged in corresponding different configurations as well. For instance, the four protruding elements 306 may be arranged in a rhomboidal or trapezoidal pattern such that two of the protruding elements 306 may be askew from the other two protruding elements 306. In such a scenario, the two receptacles 328 on the first sidewall 322 may similarly be positioned askew from the two receptacles 328 on the second sidewall. As a result, the protruding elements 306 may align with the receptacles 328 only when arranged in particular orientation. This could be beneficial for ensuring that the motor unit 300 is mounted to the motor receiving unit 320 in the proper configuration.

As further shown, the motor receiving unit 320 may include a groove 330 between the receptacles 328 in the first sidewall 322 and may include an additional groove (not shown) between the receptacles 328 in the second sidewall 324. The grooves 330 may facilitate mounting of the motor unit 300 by acting as a guide for the head portions 310 of the protruding elements 306, as described in further detail below.

In practice, the motor receiving unit 320 may be coupled to a UAS, such that inserting the motor unit 300 into the motor receiving unit 320 facilitates mounting the motor unit 300 to the UAS. Accordingly, the motor receiving unit 320 may include a base 332 configured to couple the motor receiving unit 320 to the UAS, and the first and second sidewalls 322, 324 may be coupled to, and extend vertically upward from, the base 332. However, during operation, the motor 302 of the motor unit 300 may vibrate the first and second sidewalls 322, 324, and these vibrations may negatively impact flight performance if transferred through the base 332 to the UAS. Accordingly, the motor receiving unit 320 may include vibration dampeners 334 to reduce the amount of vibration that is transferred from the motor 302 to the UAS. The vibration dampeners 334 may be made of various materials capable of absorbing and reducing the transfer of vibrations. For example, the vibration dampeners 334 may be made of an elastomer, including various types of rubbers and plastics. Other examples are possible as well. The vibration dampeners 334 may be coupled to the base 332 such that, when the motor receiving unit 320 is mounted to the UAS, the base 332 and the first and second sidewalls 322, 324 are isolated from the UAS. This arrangement is described in further detail below with reference to FIGS. 4A and 4B.

Figure 3C:
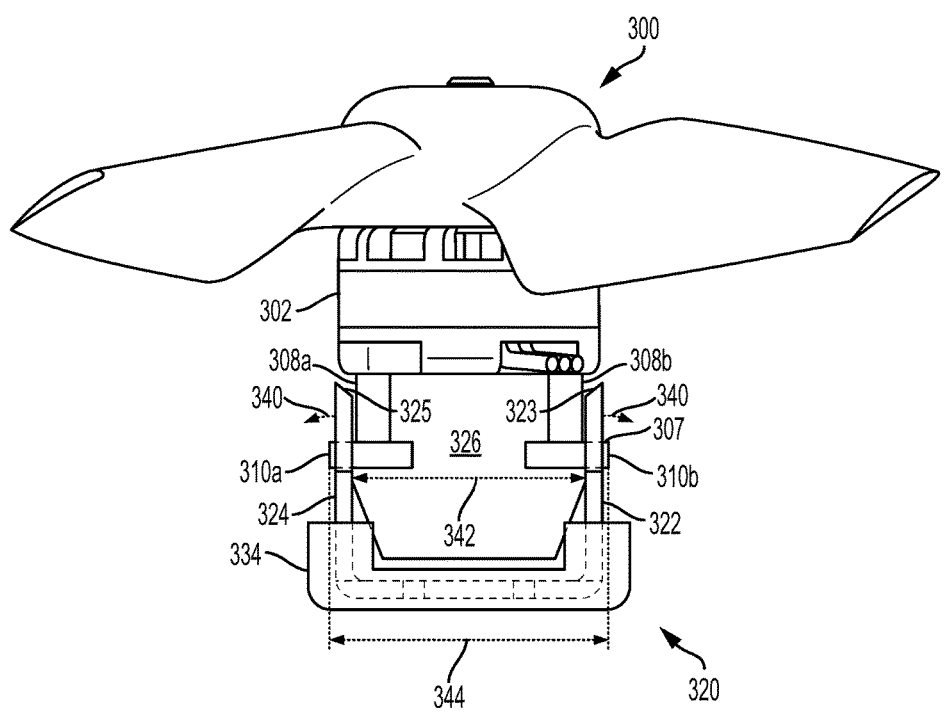
FIG. 3C is a simplified illustration of a motor unit of an unmanned aerial system mounted in a motor receiving unit of the unmanned aerial system, according to an example embodiment.

FIG. 3C is a simplified side-view illustration of the motor unit 300 mounted to the motor receiving unit 320, according to an example embodiment. The motor unit 300 may be mounted to the motor receiving unit 320 by inserting the protruding elements 306 into the gap 326 between the first and second sidewalls 322, 324 such that the head portions 310 of the protruding elements 306 interlock with the receptacles 328 of the first and second sidewalls 322, 324. This process is explained in further detail below with reference to FIGS. 5A-5C.

As shown, the motor receiving unit 320 generally forms a "U" shape with the first and second sidewalls 322, 324 extending upwardly from a base of the motor receiving unit 320. This may allow the first and second sidewalls 322, 324 to flex outwardly, as shown by arrows 340, when an outward force is applied to the first and second sidewalls 322, 324. In order to facilitate this flexing, the sidewalls 322, 324 may be made of a material having an elasticity that allows the sidewalls 322, 324 to flex without breaking or deforming. Examples of such materials include acrylonitrile butadiene styrene (ABS) plastics, polycarbonate (PC) plastics, or a combination of these. Other examples are possible as well.

In a rest position (e.g., when an outward force is not causing the first and second sidewalls 322, 324 to flex outwardly), the first and second sidewalls 322, 324 are separated by a distance 342. The protruding elements 306 have an overall width 344 that extends from an outer edge of the leftmost head portion 310a to an outer edge of the rightmost head portion 310b. The overall width 344 of the protruding elements 306 may be larger than the distance 342 between the first and second sidewalls 322, 324. Consequently, inserting the protruding elements 306 into the gap 326 between the first and second sidewalls 322, 324 may exert an outward force on the first and second sidewalls 322, 324 causing the first and second sidewalls 322, 324 to temporarily flex outward, as indicated by arrows 340. When the head portions 310 of the protruding elements 306 are aligned with the receptacles 328 of the first and second sidewalls 322, 324, the receptacles 328 may provide openings through which the head portions 310 may extend, such that the head portions 310 no longer exert the outward force on the first and second sidewalls 322, 324. This may allow the first and second sidewalls 322, 324 to return to the rest position. In this position, the head portions 310 are interlocked with the receptacles 328, thereby restricting movement of the motor unit 300 relative to the motor receiving unit 320.

In some examples, a width of the protruding elements 306 that extends from the leftmost shank portion 308a to the rightmost shank portion 308b may also be slightly larger than the rest distance 342 between the first and second sidewalls 322, 324. As a result, even after the head portions 310 interlock with the receptacles 328, the first and second sidewalls 322, 324 may be restricted from returning to the rest position due to contact with the shank portions 308a, 308b. This may cause the first and second sidewalls 322, 324 to exert a compressive force on the shank portions 308a, 308b, further securing the motor unit 300 to the motor receiving unit 320.

As further shown in FIG. 3C, a gap may be present between the top surfaces 323, 325 of the first and second sidewalls 322, 324 and the bottom surface of the motor 302. In such a scenario, in order to vertically retain the motor unit 300, the heads 310 of the protruding elements 306 may be designed to fit snugly within the receptacles 328 of the first and second sidewalls 322, 324. And, as noted above, the compressive force exerted by the first and second sidewalls 322, 324 on the shank portions 308 of the protruding elements 306 may further aid in the retention of the motor unit 300.

However, in some examples, the motor receiving unit 320 may alternatively be designed such that the top surfaces 323, 325 of the first and second sidewalls 322, 324 contact the bottom surface of the motor 302. For instance, the first and second sidewalls 322, 324 could be designed such that, when the motor unit 300 is mounted to the motor receiving unit 320, the top surfaces 307 of the head portions 310 of the protruding elements 306 snugly interface with inner surfaces of the receptacles 328, and the top surfaces 323, 325 of the first and second sidewalls 322, 324 snugly interface with the bottom surface of the motor 302. In this manner, the motor unit 300 may be inhibited from moving vertically with respect to the motor receiving unit 320.

Figure 4A:
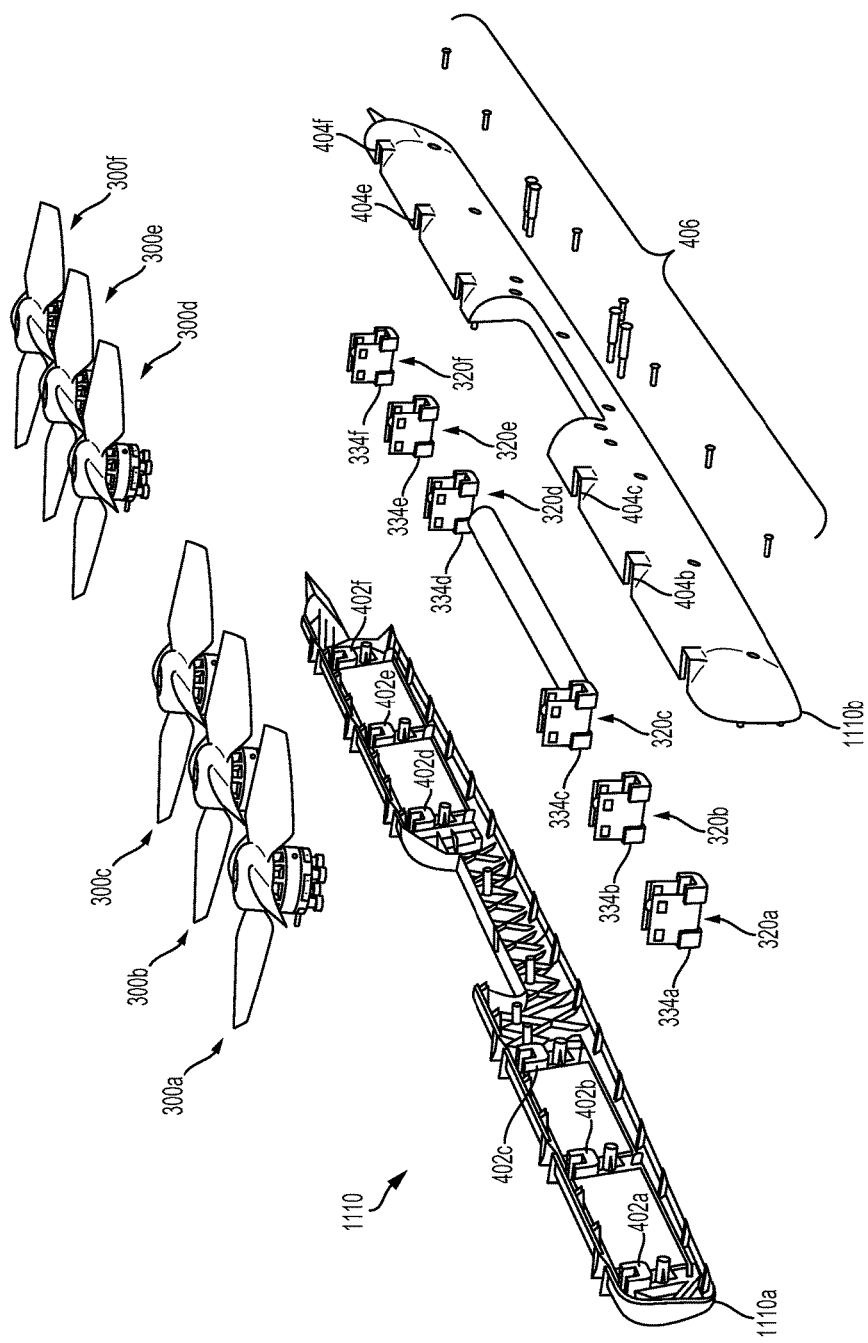
FIG. 4A is an exploded view illustration of an unmanned aerial system having motor receiving units and corresponding motor units, according to an example embodiment.

FIG. 4A is an exploded view illustration of part of a UAS having a number of the motor receiving units 320 and corresponding motor units 300, according to an example embodiment. Specifically, FIG. 4A illustrates a more detailed view of one of the rotor supports 1110 of the UAS 1100a depicted in FIG. 1A. As shown, the rotor support 1110 may separate into a left half 1110a and a right half 1110b and may be capable of supporting six motor receiving units 320a-f and six motor units 300a-f. However, the number of supported motor units 300 and motor receiving units 320, as well as the manner in which the rotor support 1110 supports them, may vary across examples.

As shown, the rotor support 1110 may include a number of brackets 402a-f for interfacing with the motor receiving units 320a-f. In particular, the brackets 402a-f may be configured to interface with the vibration dampeners 334a-f of the motor receiving units 320a-f, such that the sidewalls 322, 324 of the motor receiving units 320a-f may not make direct contact with the rotor support 1110. In line with the discussion above, this may reduce the amount of vibration that is transferred from the motor units 300*a-f* to the rotor support 1110.

Figure 4B:
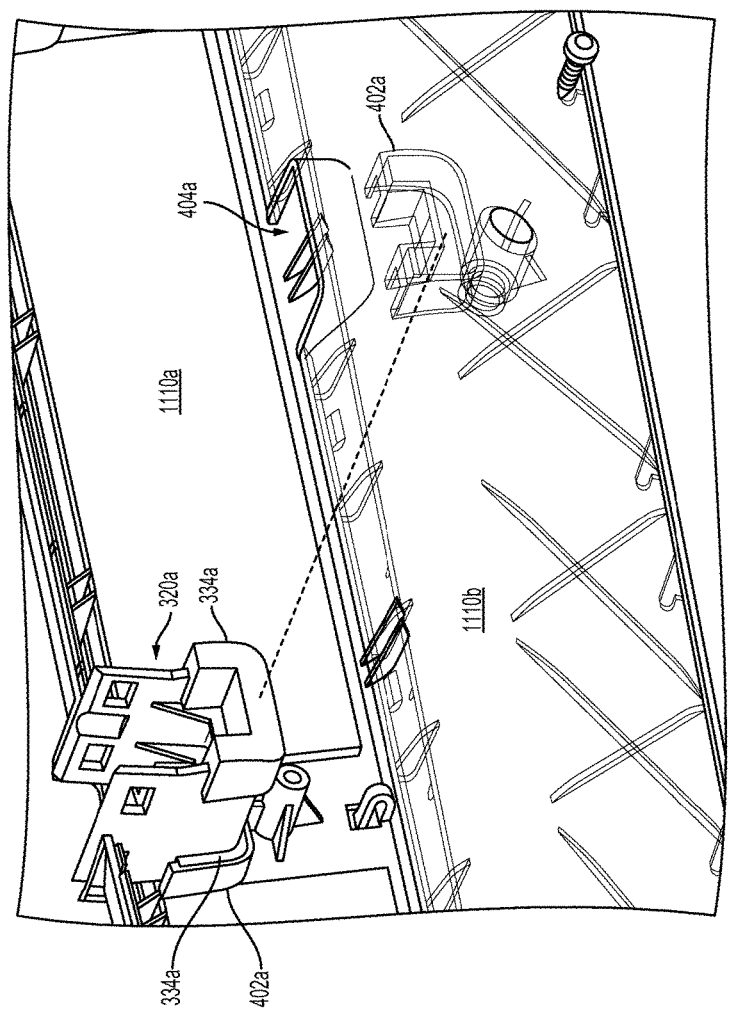
FIG. 4B is a simplified illustration of a motor receiving unit coupled to an unmanned aerial system, according to an example embodiment

FIG. 4B is a close-up view illustrating in further detail how one of the motor receiving units 320*a* may be supported in the rotor support 1110, according to an example embodiment. As shown, both the left half 1110*a* and the right half 1110*b* of the rotor support 1110 may include a bracket 402*a* for interfacing with the vibration dampener 334*a*. The bracket 402*a* may be shaped such that the vibration dampener 334*a* fits snugly within the bracket 402*a* when the left half 1110*a* and the right half 1110*b* of the rotor support 1110 are joined together. In some examples, the vibration dampener 334*a* may be secured within the bracket 402*a* using an adhesive, an epoxy, or the like. The left half 1110*a* and the right half 1110*b* of the rotor support 1110 may be joined together in various ways. As shown in FIG. 4A, a number of bolts 406 may be used to join the left half 1110*a* and the right half 1110*b* of the rotor support 1110 together, but other examples are possible as well.

As further shown in FIGS. 4A and 4B, the rotor support 1110 may include a number of openings 404*a-f* along a top surface of the rotor support 1110. These openings 404*a-f* may be arranged so that the motor receiving units 320*a-f* remain uncovered when the left half 1110*a* and the right half 1110*b* of the rotor support 1110 are joined together. As such, the motor units 300*a-f* may be mounted to, and unmounted from, the motor receiving units 320*a-f* through the openings 404*a-f*.

Figure 5A:
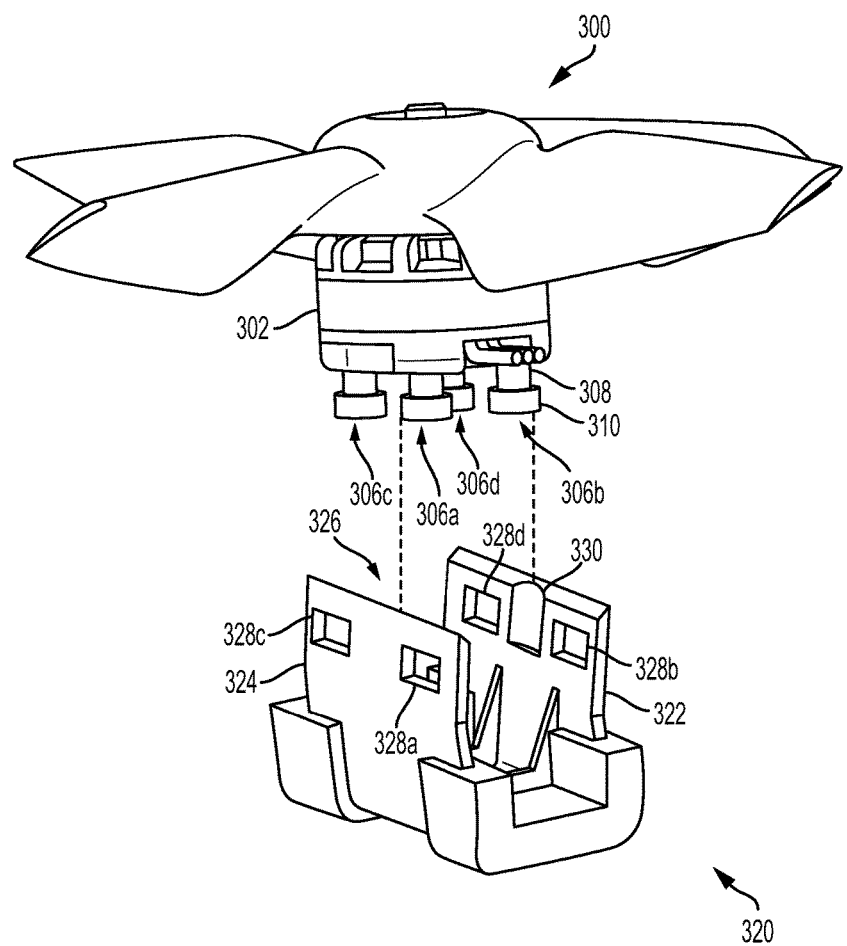
FIG. 5A is a simplified illustration of a motor unit of an unmanned aerial system being mounted in a motor receiving unit of the unmanned aerial system, according to an example embodiment.
Figure 5B:
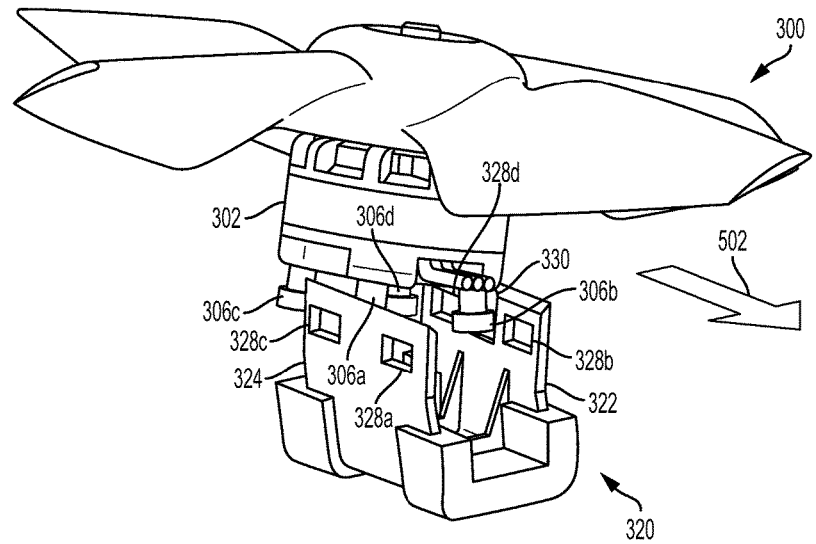
FIG. 5B is a simplified illustration of a motor unit of an unmanned aerial system being mounted in a motor receiving unit of the unmanned aerial system, according to an example embodiment.
Figure 5C:
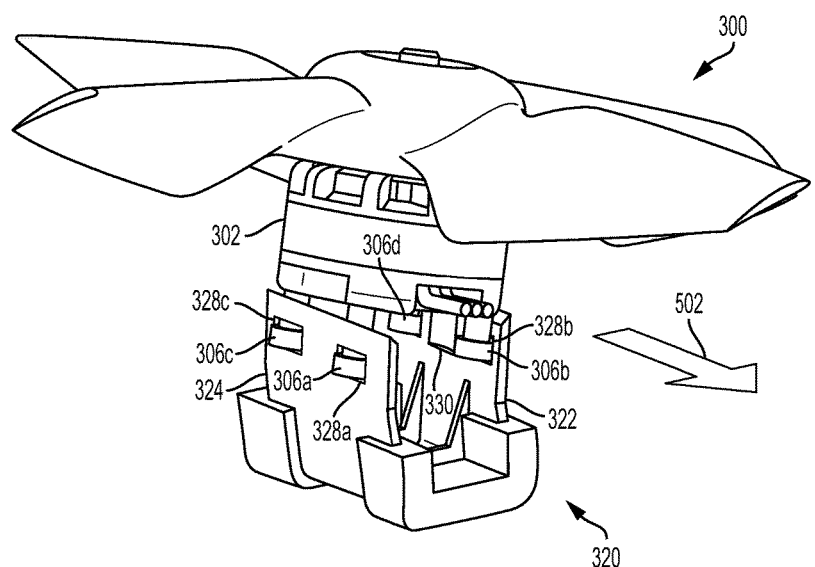
FIG. 5C is a simplified illustration of a motor unit of an unmanned aerial system being mounted in a motor receiving unit of the unmanned aerial system, according to an example embodiment.

FIGS. 5A-5C next illustrate a process of mounting a motor unit 300 to a motor receiving unit 320, according to an example embodiment. As shown in FIG. 5A, the motor unit 300 may be positioned above the motor receiving unit 320, such that two of the protruding elements 306*a*, 306*b* are vertically aligned with the grooves 330 in the first and second sidewalls 322, 324. Positioning protruding elements 306*a*, 306*b* above the grooves 330 may cause the remaining protruding elements 306*c*, 306*d* to be positioned off to the side of the receiving device 320.

Referring next to FIG. 5B, the motor unit 300 may be moved toward the motor receiving unit 320, thereby inserting protruding elements 306*a*, 306*b* into the gap 326 between the first and second sidewalls 322, 324. As protruding elements 306*a*, 306*b* are inserted into the gap 326, the groves 330 may act as a guide such that the protruding elements 306*a*, 306*b* slide along the grooves 330. Meanwhile, protruding elements 306*c*, 306*d* may be lowered alongside the motor receiving unit 320, outside of the gap 326 between the first and second sidewalls 322, 324.

In addition to guiding the path of protruding elements 306*a*, 306*b*, the grooves 330 may reduce the amount of force needed to insert protruding elements 306*a*, 306*b* into the gap 326 between the first and second sidewalls 322, 324. As noted above, protruding elements 306*a*, 306*b* may have an overall width that is larger than the distance between the first and second sidewalls 322, 324, such that inserting protruding elements 306*a*, 306*b* into the gap 326 may exert an outward force on the first and second sidewalls 322, 324. The grooves 330 in the first and second sidewalls 322, 324 may effectively increase the distance between the first and second sidewalls 322, 324, such that the force exerted by protruding elements 306*a*, 306*b* on the first and second sidewalls 322, 324 is reduced or eliminated when positioned within the grooves 330.

Protruding elements 306*a*, 306*b* may be lowered into the grooves 330 until the head portions 310 of the protruding elements 306*a*, 306*b* are horizontally aligned with the receptacles 328 in the first and second sidewalls 322, 324. In some examples, the grooves 330 may include bottom edges or ridges that align with the bottom edges of the receptacles 328. As such, protruding elements 306*a*, 306*b* may be lowered into the grooves 330 until the head portions 310 of protruding elements 306*a*, 306*b* make contact with the bottom edges or ridges of the grooves 330, as this may result in proper horizontal alignment between the head portions 310 and the receptacles 328.

Once the head portions 310 of protruding elements 306*a*, 306*b* are aligned with the receptacles 328, the motor unit 300 may be moved laterally relative to the motor receiving unit 320, as shown by arrow 502. This lateral movement may cause the head portions 310 of protruding elements 306*a*, 306*b* to slide out of the grooves 330 and into the receptacles 328 and may also cause the head portions 310 of protruding elements 306*c*, 306*c* to move into the gap 326 between the first and second sidewalls 322, 324 and into the receptacles 328. Specifically, as shown in FIG. 5C, the head portions 310 of protruding elements 306*a*, 306*b* may be inserted into receptacles 328*a*, 328*b*, and the head portions 310 of protruding elements 306*c*, 306*d* may be inserted into receptacles 328*c*, 328*d*.

As described above with respect to FIG. 3C, once the head portions 310 of the protruding elements 306 are inserted into the receptacles 328, the compressive force of the first and second sidewalls 322, 324 toward the protruding elements 306 may cause the protruding elements 306 to interlock with the motor receiving unit 320. Thus, in FIG. 5C, by interlocking the protruding elements 306 with the motor receiving unit 320, the motor unit 300 is mounted to the motor receiving unit 320 and may be restricted from moving relative to the motor receiving unit 320.

In some examples, the motor unit 300 may be mounted to the motor receiving unit 320 in various other ways. For instance, instead of concurrently engaging the protruding elements 306 of the motor unit 300 with both the first and second sidewalls 322, 324 as described above, the motor unit 300 can be mounted to the motor receiving unit 320 by engaging two of the protruding elements 306 with one sidewall and then subsequently engaging the other two of the protruding elements 306 with the other sidewall. In practice, for instance, instead of vertically lowering protruding elements 306*a*, 306*b* along the grooves 330, the motor unit 300 may be positioned at an angle such that the head portions 310 of protruding elements 306*b*, 306*d* are inserted into and interlock with receptacles 328*b*, 328*d* of the first sidewall 322, while the other protruding elements 306*a*, 306*c* are positioned above the motor receiving unit 320. The motor unit 300 can then be rotated along an axis that is normal to the side view depicted in FIG. 3C until the protruding elements 306*a*, 306*c* contact the top 325 of the second sidewall 324. By continuing to rotate the motor unit 300, pressure from protruding elements 306*a*, 306*c* may cause the second sidewall 324 to flex outward, allowing protruding elements 306*a*, 306*c* to be rotated downward into the motor receiving unit 320. As shown in FIGS. 3B, 3C, and 5A-5C, the tops of the first and second sidewalls 322, 324 may be chamfered to allow the protruding elements 306 to more easily rotate downward into the motor receiving unit 320. The motor unit 300 may be rotated until the protruding elements 306*a*, 306*c* align with and interlock with receptacles 328*a*, 328*c* of the second sidewall 324.

While the above examples are described in the context of vertically mounting and a motor unit 300 to a motor receiving unit 320 that is located below the motor unit 300, it will be understood that this description may apply to other orientations as well by rotating the motor unit 300 and the motor receiving unit. For example, the motor unit 300 may be mounted horizontally to a motor receiving unit 320, as may be the case when the motor unit 300 takes the form of propulsion unit 1106 of the UAS 1100a depicted in FIG. 1A. Other examples are possible as well.

In order to unmount the motor unit 300 from the motor receiving unit 320, a process may be employed that is the reverse of the process illustrated in FIGS. 5A-5C. For example, the motor unit 300 in FIG. 5C may be moved laterally until protruding elements 306a, 306b are moved out of receptacles 328a, 328b and into the grooves 330, and protruding elements 306c, 306d are moved out of receptacles 328c, 328d and positioned alongside the motor receiving unit 320. The motor unit 300 may then be moved vertically away from the motor receiving unit 320, causing protruding elements 306a, 306b to slide along the grooves 330 until the motor unit 300 is completely removed from the motor receiving unit 320.

In other examples, the motor unit 300 may be unmounted from the motor receiving unit 320 by applying a sufficiently strong lateral force (e.g. along arrow 502) to the motor unit 300. The lateral force may cause protruding elements 306a, 306b to move out of receptacles 328a, 328b and be repositioned alongside the motor receiving unit 320, while protruding elements 306c, 306d may move out of receptacles 328c, 328d and into the grooves 300. Continuing to apply the lateral force may cause protruding elements 306c, 306d to move out of the grooves 330 and into receptacles 328a, 328b, while protruding elements 306a, 306b move farther away from the motor receiving unit 320. And still continuing to apply the lateral force may cause protruding elements 306c, 306d to move out of receptacles 328a, 328b such that the motor unit 300 is completely separated from the motor receiving unit 320.

Figure 6:
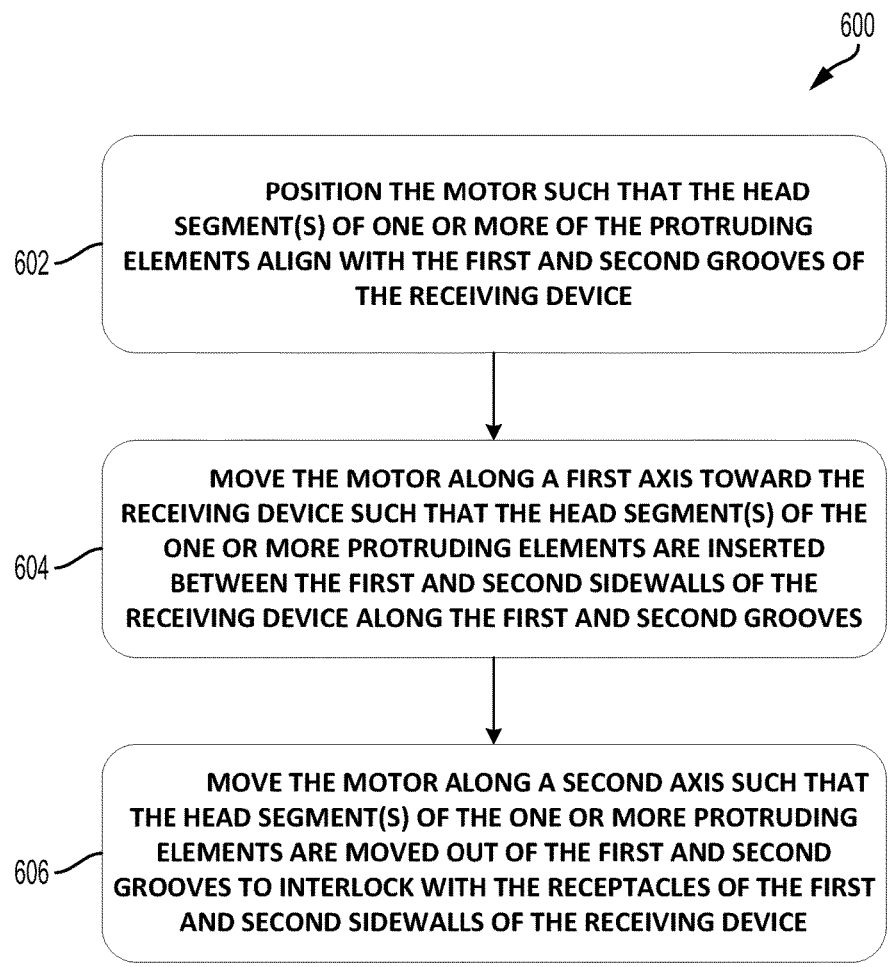
FIG. 6 is a flowchart of a method, according to an example embodiment.

FIG. 6 is a flowchart of an example method 600 for mounting a motor to a receiving device of a UAS. In line with the discussion above, the motor includes a number of protruding elements, each protruding element including a shank segment having a first diameter and a head segment having a second diameter that is larger than the first diameter, and the receiving device includes a first sidewall and a second sidewall positioned opposite one another, the first sidewall having a first groove and at least one receptacle adjacent to the first groove, and the second sidewall having a second groove and at least one receptacle adjacent to the second groove.

At block 602, the method 600 involves positioning the motor such that the head segments of one or more protruding elements of the plurality of protruding elements aligns with the first and second grooves of the receiving device. At block 604, the method 600 involves moving the motor along a first axis toward the receiving device such that the head segments of the one or more protruding elements are inserted between the first and second sidewalls of the receiving device along the first and second grooves. And at block 606, the method 600 involves moving the motor along a second axis such that the head segments of the one or more protruding elements are moved out of the first and second grooves to interlock with the receptacles of the first and second sidewalls of the receiving device. An example of the method 600 is illustrated and discussed above with respect to FIGS. 5A-5C.

V. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

I claim:

1. A system comprising:
 a receiving device comprising:
  a base configured to couple the receiving device to an unmanned aerial system (UAS);
  a first sidewall extending upwardly from a first side of the base, wherein a side face of the first sidewall includes at least one receptacle; and
  a second sidewall extending upwardly from a second side of the base, wherein a side face of the second sidewall includes at least one receptacle; and
 a motor coupling comprising one or more protruding elements, wherein each protruding element comprises a shank segment having a first diameter and a head segment having a second diameter that is larger than the first diameter, wherein each head segment is configured to interlock with one or more of the receptacles of the first sidewall or the second sidewall when the motor coupling is inserted between the first sidewall and the second sidewall of the receiving device.

2. The system of claim 1, wherein the receptacles of the first and second sidewalls comprise openings in the first and second sidewalls.

3. The system of claim 1, wherein the motor coupling is configured to couple to a motor of the UAS, and wherein the one or more protruding elements of the motor coupling are configured to protrude from a bottom surface of the motor.

4. The system of claim 1, wherein the motor coupling comprises four of the protruding elements, wherein the first sidewall includes two of the receptacles, wherein the second sidewall includes two of the receptacles, wherein the head segments of a first protruding element and a second protruding element of the four protruding elements are configured to interlock with the two receptacles of the first sidewall, and wherein the head segments of a third protruding element and a fourth protruding element of the four protruding elements are configured to interlock with the two receptacles of the second sidewall.

5. The system of claim 4, wherein the first and second protruding elements are askew relative to the third and fourth protruding elements, and wherein the two receptacles of the first sidewall are askew relative to the two receptacles of the second sidewall.

6. The system of claim 1, wherein the first sidewall and the second sidewall of the receiving device each include a groove configured to receive the one or more protruding elements, such that the one or more protruding elements can interlock with the receptacles of the first and second sidewalls by moving the one or more protruding elements out of the grooves of the first and second sidewalls and into the receptacles of the first and second sidewalls.

7. The system of claim 6, wherein the first and second sidewalls each include two of the receptacles, wherein the groove of the first sidewall is located between the two receptacles of the first sidewall, and wherein the groove of the second sidewall is located between the two receptacles of the second sidewall.

8. The system of claim 1, wherein the motor coupling has an overall diameter that extends from a first outer edge of a first head segment of a first one of the protruding elements to a second outer edge of a second head segment of a second one of the protruding elements, and wherein the first sidewall of the receiving device is separated from the second sidewall of the receiving device by a distance smaller than the overall diameter of the motor coupling.

9. The system of claim 1, wherein the receiving device further comprises a vibration dampener configured to couple to the UAS, and wherein the base is configured to couple the receiving device to the UAS via the vibration dampener.

10. The system of claim 9, wherein the vibration dampener comprises an elastomer.

11. The system of claim 1, wherein the first and second sidewalls of the receiving device comprise a polycarbonate or an acrylonitrile butadiene styrene (ABS) polymer.

12. The system of claim 1, wherein the shank segment and the head segment of the one or more protruding elements comprise aluminum or nylon.

13. An unmanned aerial system (UAS) comprising:
a motor;
one or more protruding elements coupled to the motor, wherein each protruding element comprises a shank segment having a first diameter and a head segment having a second diameter that is larger than the first diameter; and
a receiving device configured to receive the one or more protruding elements, the receiving device comprising:
a base configured to couple the receiving device to the UAS;
a first sidewall extending upwardly from a first side of the base, wherein a side face of the first sidewall includes at least one receptacle; and
a second sidewall extending upwardly from a second side of the base, wherein a side face of the second sidewall includes at least one receptacle,
wherein the head segment of each protruding element of the one or more protruding elements is configured to interlock with one or more of the receptacles of the first sidewall or the second sidewall when the one or more protruding elements are inserted between the first sidewall and the second sidewall of the receiving device.

14. The UAS of claim 13, wherein the receptacles of the first and second sidewalls comprise openings in the first and second sidewalls.

15. The UAS of claim 13, wherein the one or more protruding elements comprises four of the protruding elements, wherein the first sidewall includes two of the receptacles, wherein the second sidewall includes two of the receptacles, wherein the head segments of a first protruding element and a second protruding element of the four protruding elements are configured to interlock with the two receptacles of the first sidewall, and wherein the head segments of a third protruding element and a fourth protruding element of the four protruding elements are configured to interlock with the two receptacles of the second sidewall.

16. The UAS of claim 15, wherein the first and second protruding elements are askew relative to the third and fourth protruding elements, and wherein the two receptacles of the first sidewall are askew relative to the two receptacles of the second sidewall.

17. The UAS of claim 13, wherein the first sidewall and the second sidewall of the receiving device each include a groove configured to receive the one or more protruding elements, such that the one or more protruding elements can interlock with the receptacles of the first and second sidewalls by moving the one or more protruding elements out of the grooves of the first and second sidewalls and into the receptacles of the first and second sidewalls.

18. The UAS of claim 17, wherein the first and second sidewalls each include two of the receptacles, wherein the groove of the first sidewall is located between the two receptacles of the first sidewall, and wherein the groove of the second sidewall is located between the two receptacles of the second sidewall.

19. The UAS of claim 13, wherein the one or more protruding elements have an overall diameter that extends from a first outer edge of a first head segment of a first one of the protruding elements to a second outer edge of a second head segment of a second one of the protruding elements, and wherein the first sidewall of the receiving device is separated from the second sidewall of the receiving device by a distance smaller than the overall diameter of the one or more protruding elements.

20. A method of mounting a motor to a receiving device coupled to an unmanned aerial system (UAS), wherein the motor comprises a plurality of protruding elements, each protruding element comprising a shank segment having a first diameter and a head segment having a second diameter that is larger than the first diameter, wherein the receiving device comprises a first sidewall having a first groove and at least one receptacle adjacent to the first groove, wherein the receiving device further comprises a second sidewall having a second groove and at least one receptacle adjacent to the second groove, and wherein the second sidewall is positioned opposite to the first sidewall, the method comprising:
positioning the motor such that the head segments of one or more protruding elements of the plurality of protruding elements aligns with the first and second grooves of the receiving device;
moving the motor along a first axis toward the receiving device such that the head segments of the one or more protruding elements are inserted between the first and second sidewalls of the receiving device along the first and second grooves; and
moving the motor along a second axis such that the head segments of the one or more protruding elements are moved out of the first and second grooves to interlock with the receptacles of the first and second sidewalls of the receiving device.

* * * * *